(12) United States Patent
Bhatkata et al.

(10) Patent No.: US 7,471,701 B2
(45) Date of Patent: Dec. 30, 2008

(54) SEAMLESS INTEGRATED MULTIPLE WIRELESS DATA CONNECTIONS

(75) Inventors: Dharmesh N. Bhatkata, Austin, TX (US); Trung Ly, Austin, TX (US); Juan Francisco Obas, Austin, TX (US); Lakshmi Potluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 10/922,267

(22) Filed: Aug. 19, 2004

(65) Prior Publication Data

US 2006/0040673 A1 Feb. 23, 2006

(51) Int. Cl.
*H04Q 7/20* (2006.01)
(52) U.S. Cl. .................... 370/474; 455/452.2; 709/203; 709/225
(58) Field of Classification Search ........................ None
See application file for complete search history.

(56) References Cited

U.S. PATENT DOCUMENTS

| 5,602,836 | A | 2/1997 | Papadopoulos et al. ..... 370/280 |
|---|---|---|---|
| 6,263,371 | B1 | 7/2001 | Geagan, III et al. ......... 709/231 |
| 6,668,167 | B2 | 12/2003 | McDowell et al. ........... 455/412 |
| 6,684,087 | B1* | 1/2004 | Yu et al. ...................... 455/566 |
| 6,704,572 | B1 | 3/2004 | Whinnett et al. .......... 455/452.1 |
| 6,732,111 | B2* | 5/2004 | Brodersen et al. ............ 707/101 |
| 7,084,848 | B2* | 8/2006 | Senda et al. ................... 345/92 |
| 2003/0112789 | A1* | 6/2003 | Heinonen .................... 370/349 |
| 2003/0147369 | A1* | 8/2003 | Singh et al. .................. 370/338 |
| 2004/0194023 | A1* | 9/2004 | Wiechers et al. ............. 715/513 |
| 2006/0031493 | A1* | 2/2006 | Cugi ........................... 709/225 |

* cited by examiner

*Primary Examiner*—Firmin Backer
*Assistant Examiner*—Roberta A. Shand
(74) *Attorney, Agent, or Firm*—David A. Mims, Jr.; Darcell Walker (57) ABSTRACT

The present invention provides a method that will enable a wireless telephone user to more easily download information and data by from locations accessed via a communication network. This invention accomplishes this task by expanding the bandwidth of the receiving telephone device such that the bandwidth is sufficient to receive the transmitted data. The present invention expands this bandwidth at the receiver location by combining the bandwidth of the additional wireless telephones with the bandwidth of one requester telephone and receiving a portion of the information at each of the wireless telephones.

1 Claim, 9 Drawing Sheets

SEAMLESS INTEGRATED MULTIPLE WIRELESS DATA CONNECTIONS

FIELD OF THE INVENTION

The present invention refers to a method and system for downloading information to a cellular telephone from a communication network and in particular to a method and system for downloading a set of data over a cellular telephone network using the combined bandwidth of a set of two or more cellular telephones.

BACKGROUND OF THE INVENTION

The advances in technology have made today's society a more paperless and wireless society. The emergence of global computer and communication networks enable people to communicate instantly and transmit various types of data through these communication networks. In addition to the advancements in computer and communication networks, the technology that provides for communication via the telephone has also made substantial advances in the past two decades. Historically, a telephone network comprised a telephone connected to a central switching box/location. These switching locations were connected through networks of cables. Many of these communication cables were large lines that contained many small communication wires that carried the telephone information. Today, telephone communications are much more sophisticated than the traditional telephone networks. The basic telephone network having a telephone connected to a switching box does still exist. However, because of the variety of telephones that are in use, today's telephone communication network configurations include the basic telephone network and other communication means and devices.

The use of the telephone in a wireless network configuration has made telephone communication more convenient. Because many people access global communication networks such as the Internet via a telephone, it appears that a logical progression of technology would lead to the development of technologies that incorporate wireless telephone devices as part of global computer and communication networks.

Figure 1:
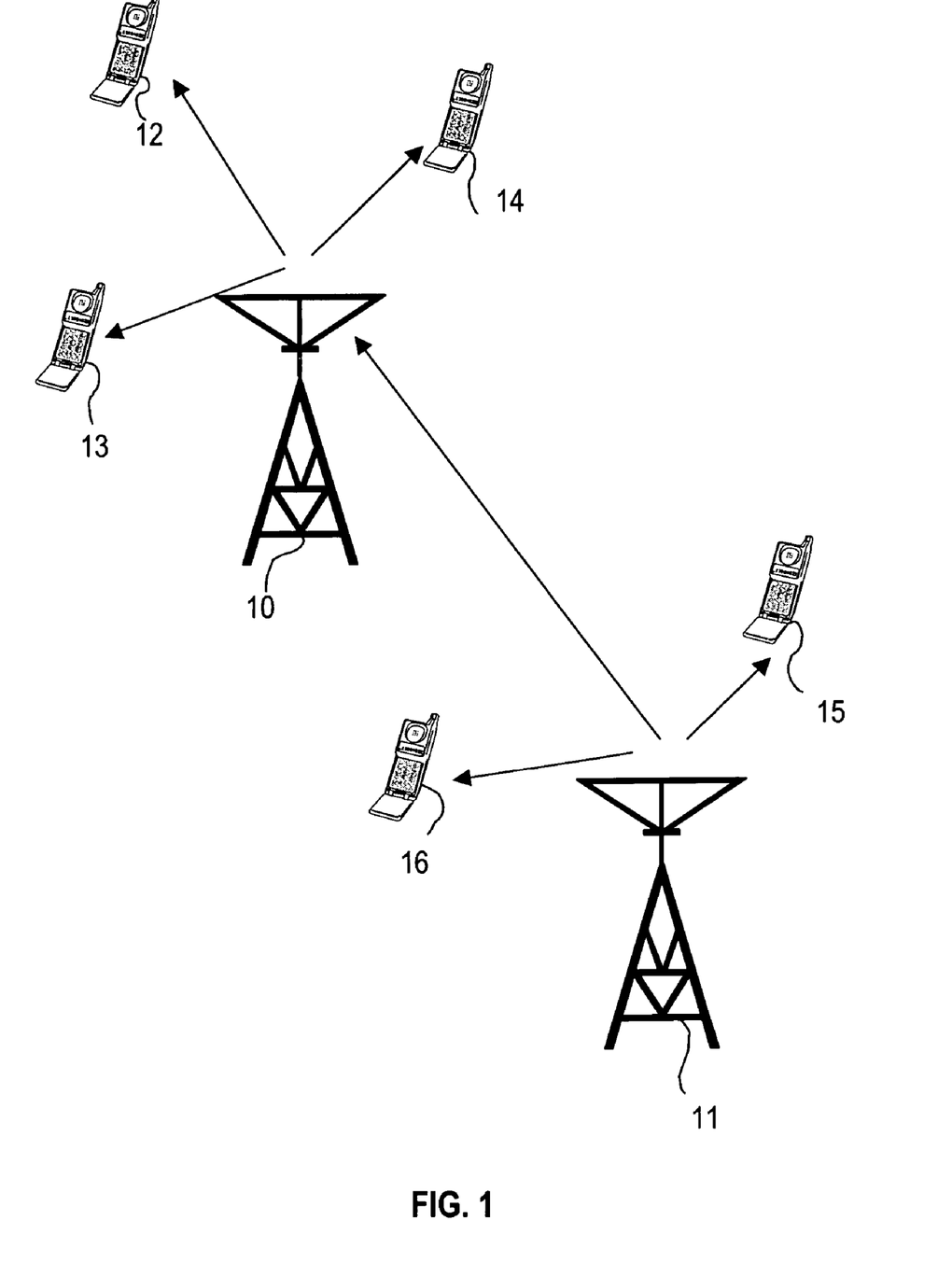
FIG. 1 is an illustration of a typical wireless/mobile telephone network.

As shown in FIG. 1, telephone communication networks incorporate both wireless and physical connection devices. Communication towers 10 and 11 provide the connection means for mobile and wireless devices within this network. Each tower has a defined area in which the tower provides wireless telephone connections. As shown, tower 10 serves mobile devices 12, 13, and 14. Tower 11 serves mobile devices 15 and 16. Within a defined area, the tower will facilitate the connection of wireless devices to the telephone network. This connection will enable a wireless device 16 to connect to other wireless devices or to conventional and stationary devices such as homes, factories and office buildings.

Figure 2:
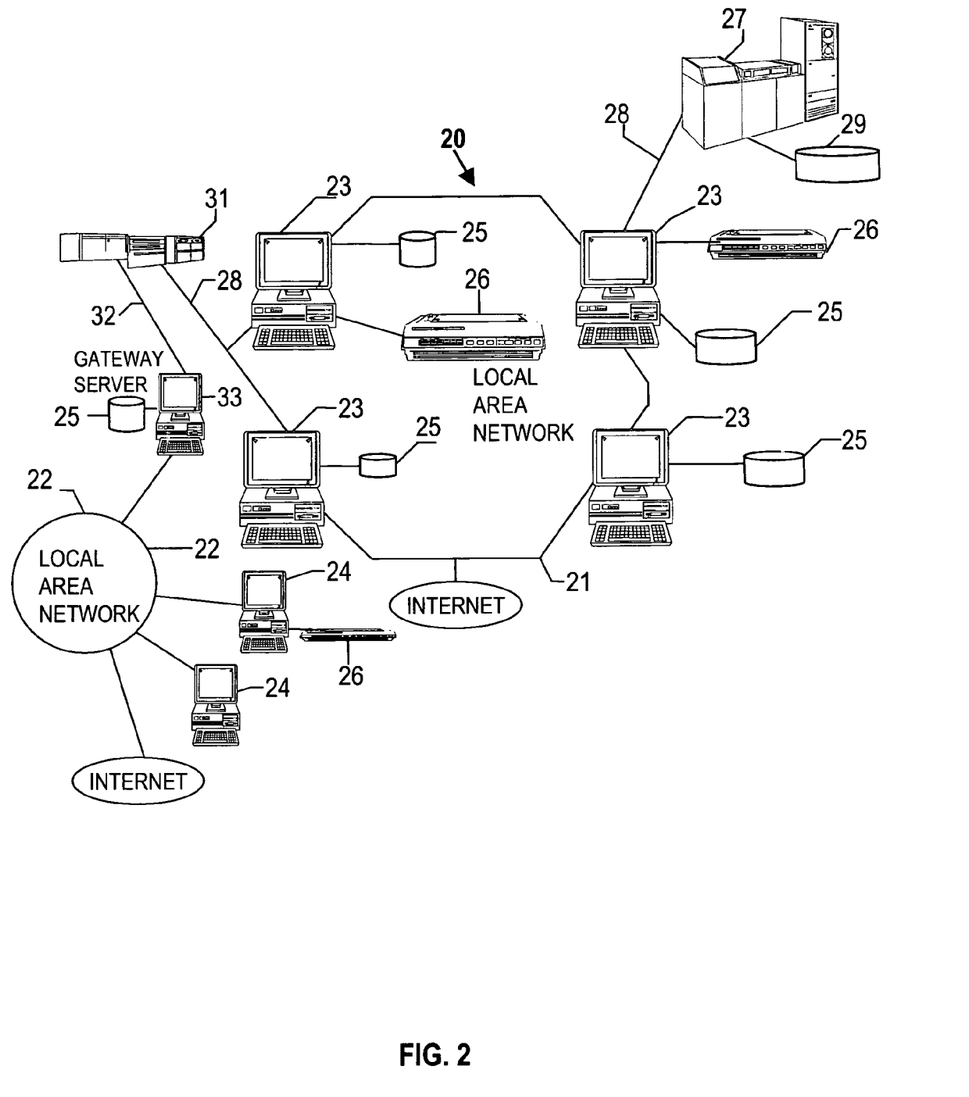
FIG. 2 is a configuration of a computer based communication network.

Referring to FIG. 2, there is depicted a pictorial representation of a distributed computer network environment 20. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS), which serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 3:
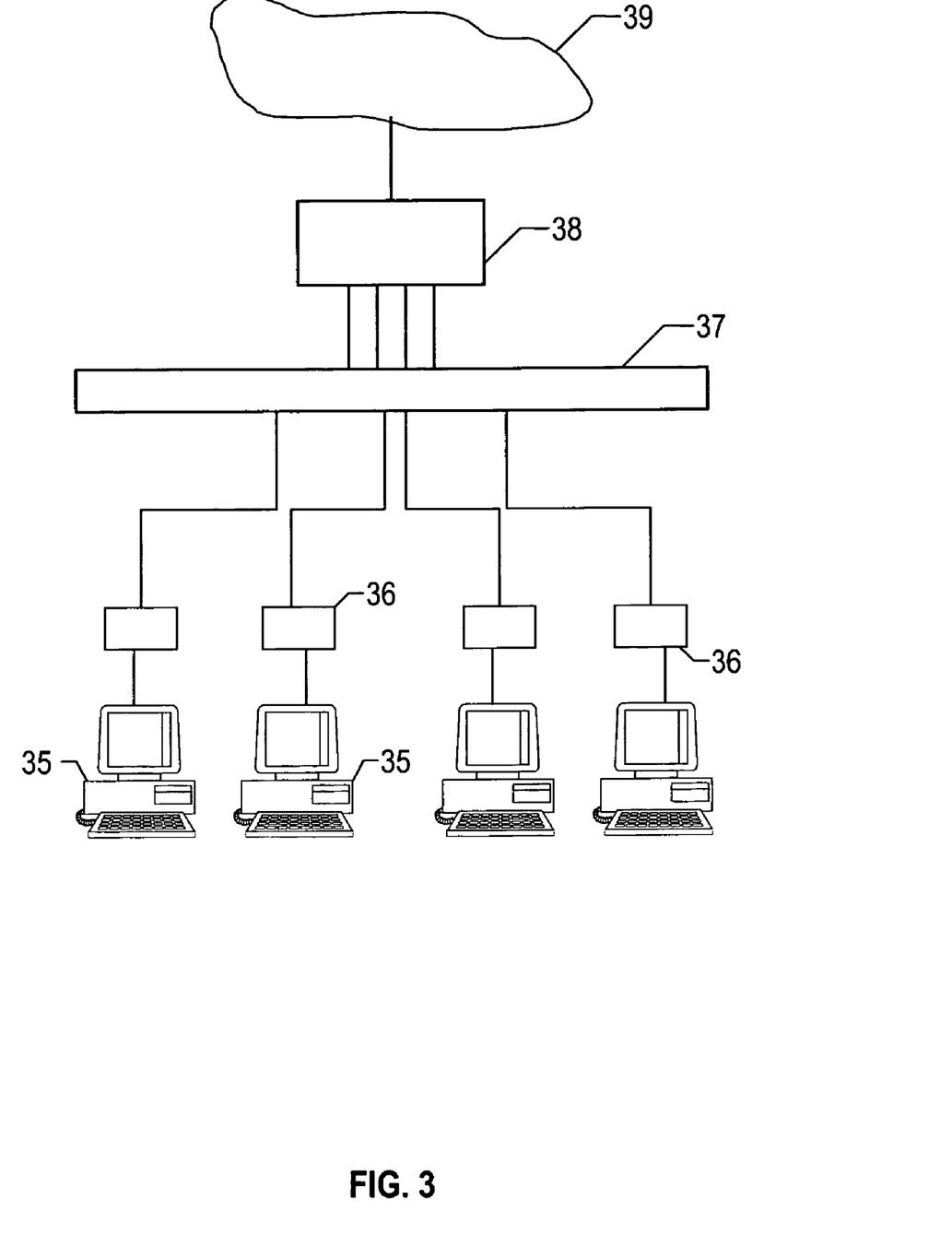
FIG. 3 is an illustration of a computer based communication network incorporating public telephones.

FIG. 3 is an illustration of a computer based communication network (i.e., the Internet) incorporating public telephones. As shown, this network incorporates individual terminals 35 that connect to modems 36. These modems also connect to a public telephone network 37. Many of the connections to these global computing networks are via telephone access through telephone networks. The terminal user is connects to a network server 38 via the modem and telephone network. The server 38 could be from an Internet Service Provider (ISP). The server connects the user to the global computing network 39.

Figure 4:
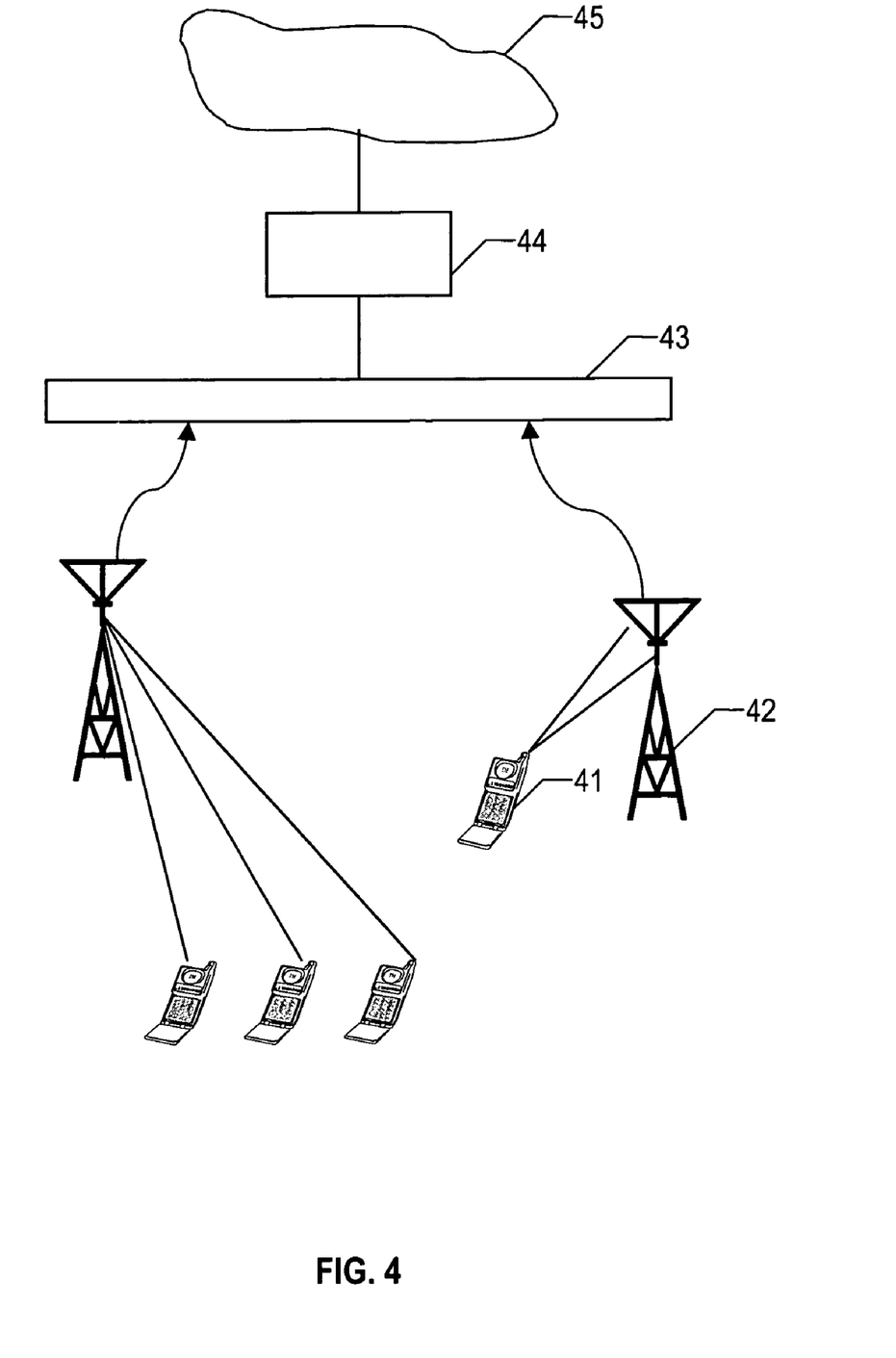
FIG. 4 is an illustration of a communication network incorporating wireless telephones and computer devices.

FIG. 4 is an illustration of a computer based communication network incorporating cellular telephones. In addition to this configuration, there can be other configurations that enable the mobile telephone user to access the Internet. This configuration is conceptually similar to FIG. 3. However, in this configuration, a mobile telephone 41 and not the terminal 35 serves as the communication means for the end user. The communication tower 42 connects the mobile telephone user with the telephone communication network 43. At this point, the server 44 provides the connection to the rest of the communication network 45.

New telephone designs for effecting telephone communication using the Internet are now being developed. Since the internet is basically free of charge, what the user pays for internet telephone communication is the charge based on the contract with the internet service provider and the charge for the call between the user and the internet service provider or the charge for the use of ISDN.

Although, the mobile telephone can be used as device to access the Internet, this device still has the primary purpose of enabling people to communication verbally or orally. The standard types of voice communications provided by the mobile telephone do not require the amount of bandwidth necessary transmit and received other types of data such as text data or graphics. Low bandwidth wireless telephone data connections limit the capabilities that could be made possible with a larger bandwidth data connection. It can be used to look up movie items, weather, or sports scores in a reasonable manner, but doing more advanced tasks, such as downloading maps or streaming audio is next to impossible. New technologies are constantly emerging that promise to solve the problem of low bandwidth, but will take large amount of money and time to deploy. The main drawback of these solutions is that they would be much more costly to the consumer.

For example, one mobile telephone company plans to build a $1 billion high-speed wireless network, but the cost for the service is $80/user. The characterization of frequency propagation (especially urban) was extremely important for the development of earlier mobile radio systems and paved the way for cellular. Early mobile radio systems used much lower frequencies than the 800 MHz band now used by most cellular systems.

Although, the advances in cellular telephone technology have enabled the user to connect the Internet and to perform various tasks and receive various types of information, the bandwidth limitations for these cellular telephones have hampered more expansion of the capabilities of the cellular telephone. Therefore, there remains a need for a system that will enable the cellular telephone to have the capabilities to connect to and transfer information from the Internet in a reliable and timely manner.

SUMMARY OF THE INVENTION

It is an objective of the present invention to provide a method that increases the capabilities of a wireless telephone to connect to and download data packets from a location accessed via a communication network.

It is a second objective of the present invention to provide a method that increases the bandwidth used by a wireless telephone for the purpose of receiving information packets from a location accessed via a communication network.

It is a third objective of the present invention to provide a method that can distribute between two or more wireless telephones, the responsibilities for downloading information packets from a location accessed via a communication network.

It is a fourth objective of the present invention to provide a method that transmits information packets that were downloaded to multiple wireless telephones to one wireless telephone.

It is a fifth objective of the present invention to provide a method capable of streaming together the information packets received at the multiple wireless telephones for transmission to the one wireless telephone.

It is typical in a social environment to have multiple wireless telephones in one room at a time. Thus, the proposed solution in the present invention is to combine the data capabilities (bandwidth) of the multiple wireless telephones and funnel them into one wireless telephone. The single benefiting wireless telephone can then interact with the data provider at many times the bandwidth that would have been possible with it's single data connection. The proposed implementation should be seamless to provide for quick adaptation and at a very reasonable cost.

The present invention provides a method that will enable a wireless telephone user to more easily download information and data by from locations accessed via a communication network. This invention accomplishes this task by expanding the bandwidth of the receiving telephone device such that the bandwidth is sufficient to receive the transmitted data. The present invention expands this bandwidth at the receiver location by combining the bandwidth of the additional wireless telephones with the bandwidth of one requester telephone and receiving a portion of the information at each of the wireless telephones, before transferring that information to the requestor telephone. By dividing the information among the various telephones, the amount of bandwidth required to receive the data is now available and the message can download much faster, than if only one telephone attempted to download the data.

In an example, a wireless telephone may have a bandwidth for downloading information of 2 MHZ. However, the user of the telephone may desire to download information that has a bandwidth of 5 MHZ. Because the bandwidth of the data is much greater than the bandwidth of the wireless telephone, this device would take a substantial amount of time to down load this information. The telephone user may not even be able to adequately download this information. In accordance with the present invention, a user attempting to download this information would solicit the assistance of additional wireless telephone users in the same vicinity. The information packet would be downloaded between the multiple wireless telephone users. Each users would download a portion of the information, thereby eliminating the need for one user to attempt to download the entire packet of information.

Referring to this example, the steps of the present invention include a request by one wireless telephone user, referred to as the requestor, to use the receiving capabilities of wireless telephone users. After, the requestor has received the confirmations from the other users; there is a determination of the number of users that will be part of this download process. It is necessary to get an accurate count of the number of telephones that will be available in order to distribute the information among the users. After determining the number of available telephones, the packet ranges or bandwidth ranges are assigned to each participating telephone. In the above-described example, if there are a total of three telephones, the packet ranges could be divided equally between the three wireless telephones. With this approach, each wireless telephone could receive information in the bandwidth range of 1.7 MHZ. One range would the lower range 0 MHZ to 1.7 MHZ, the second range could be 1.7 MHZ to 3.4 MHZ and the third range would be 3.4 MHZ to 5 MHZ. As each telephone receives the data, it is streamed with the data from the other telephones and transmitted to the requestor telephone.

The following scenario further illustrates the functions and benefits of the present invention. "Four friends decide to take a road trip from Austin to Las Vegas. Seeing as how they opted for a cheap rental car, it didn't come with one of those useful GPS navigation units. No problem, they all have cellular telephones that support the multi-data connection feature. The navigator of the trip pulls up Mapquest.com on his color LCD cellular telephone. The map is taking forever to download, so he decides to ask permission to use his friends' data connection. He presses the handy one-touch button and each of the other passengers get a small chime in their handheld devices and are each asked a simple question: 'Allow external use of your data connection?' Each passenger indicates yes, and his or her telephone is used in the process to download the map. The combined telephone resources create a system having increased bandwidth. As a result, they're happily on their way in the next leg of their trip using the detailed map".

In the present invention, this cellular telephone, referred to as the requester unit, requests that use of all cell telephones in its proximity via Bluetooth technology. This technology is a wireless protocol that works in a constrained space. The Bluetooth protocol is a radio frequency based protocol for transmitting data between the contributor and requester telephones. The Bluetooth protocol has an effective transmission radius of about 30 feet. Each of the other units, referred to contributor units, will have a separate control setting. This setting enables the owner to either allow all data connection usage requests, disallow all data connection usage requests, or ask permission on a per request basis (via an audible chime and yes/no question.

Once the contributor grants the request, software that present on the requestor unit recognizes that there are connection(s) available and starts sending instructions to the nearby contributor units to "help" download the large image file. In the above-described example (two contributor devices), the requestor instructs one of the contributor units to download the middle range of packets of the file. That contributor receives the downloaded data, packages those packets and sends it to the requester device via a Bluetooth connection. A similar process is executed to retrieve the last range of packets from a second contributor unit. At the requestor unit, the embedded software reassembles the packets into a single image file for use by the requestor device.

DETAILED DESCRIPTION OF THE INVENTION

Figure 5A:
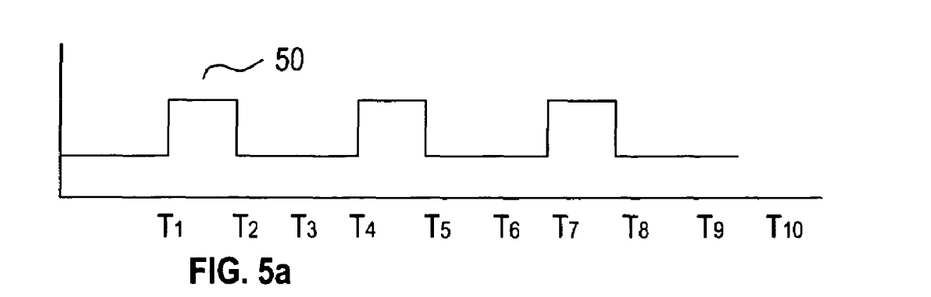
FIGS. 5a, 5b and 5c are illustrations of telephone transmissions of three wireless telephones using a time division transmission format.
Figure 5B:
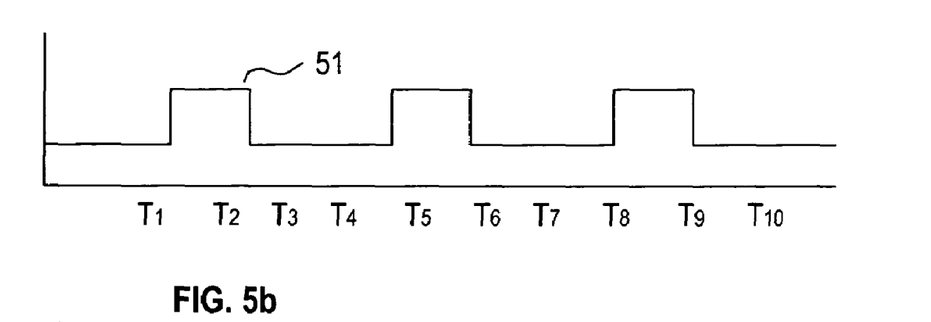
Figure 5C:
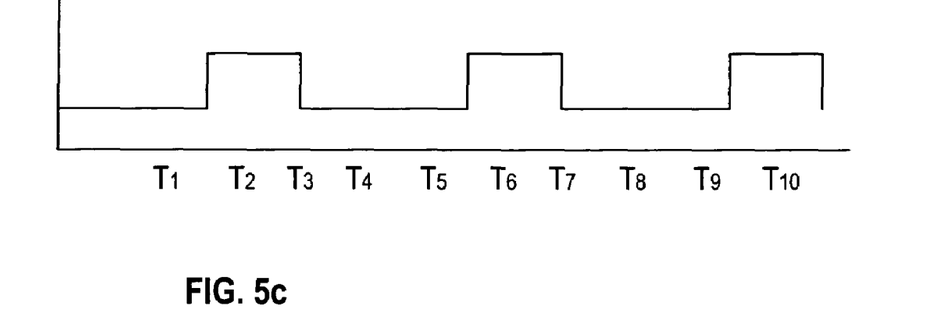

Wireless telephone transmissions occur using a time division format or a frequency division format. A time division format is one in which multiple wireless telephones transmit on the same communication channel, usually at the same frequency and bandwidth, but at different times. In fact time slots are divided among the different wireless telephone users at that time. Time division transmission schemes are well known and are implemented in a variety of data transmission applications. FIGS. 5a, 5b and 5c illustrate an example of the time division scheme for three wireless telephone users. As shown, there is a time segment with ten time intervals. FIG. 5a shows the transmission times of one of three wireless telephones. The signal transmission 50 occurs at $T_1$ to $T_2$, $T_4$ to $T_5$ and $T_7$ to $T_8$. FIG. 5b shows the signal transmission 51 of a second of the three wireless telephones. In this transmission, the transmission times are $T_2$ to $T_3$, $T_5$ to $T_6$, and $T_8$ to $T_9$. FIG. 5c shows the signal transmission 52 of a second of the three cellular telephones. In this transmission, the transmission times are $T_3$ to $T_4$, $T_6$ to $T_7$, and $T_9$ to $T_{10}$. As shown from the three transmissions, none of the transmission times overlaps and each transmission occurs without interference from the other transmissions. As previously mentioned, time division transmissions are well known in the art.

Figure 6:
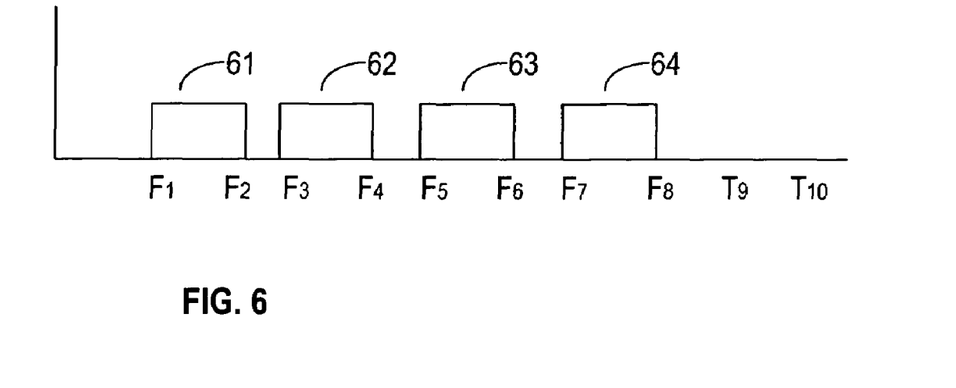
FIG. 6 is an illustration of telephone transmissions of three wireless telephones using a frequency division transmission format.

FIG. 6 is an illustration of telephone transmissions of three mobile telephones using a frequency division transmission format. As shown, there is frequency range with ten different bandwidths. Each signal is transmitted at the same time but at a different frequency. The signals can also have different bandwidths. In FIG. 6, the transmissions 61, 62, 63 and 64 occur at $F_1$ to $F_2$, $F_3$ to $F_4$, $F_5$ to $F_6$, and $F_7$ to $F_8$ respectively. Transmission 62 has a bandwidth that twice the bandwidth of the other three transmissions. The ability to transmit at a broader bandwidth enables a device to transmit information at a faster rate. This broader bandwidth also enables a device to receive larger volumes of information and at faster rates than at smaller bandwidths.

Figure 7:
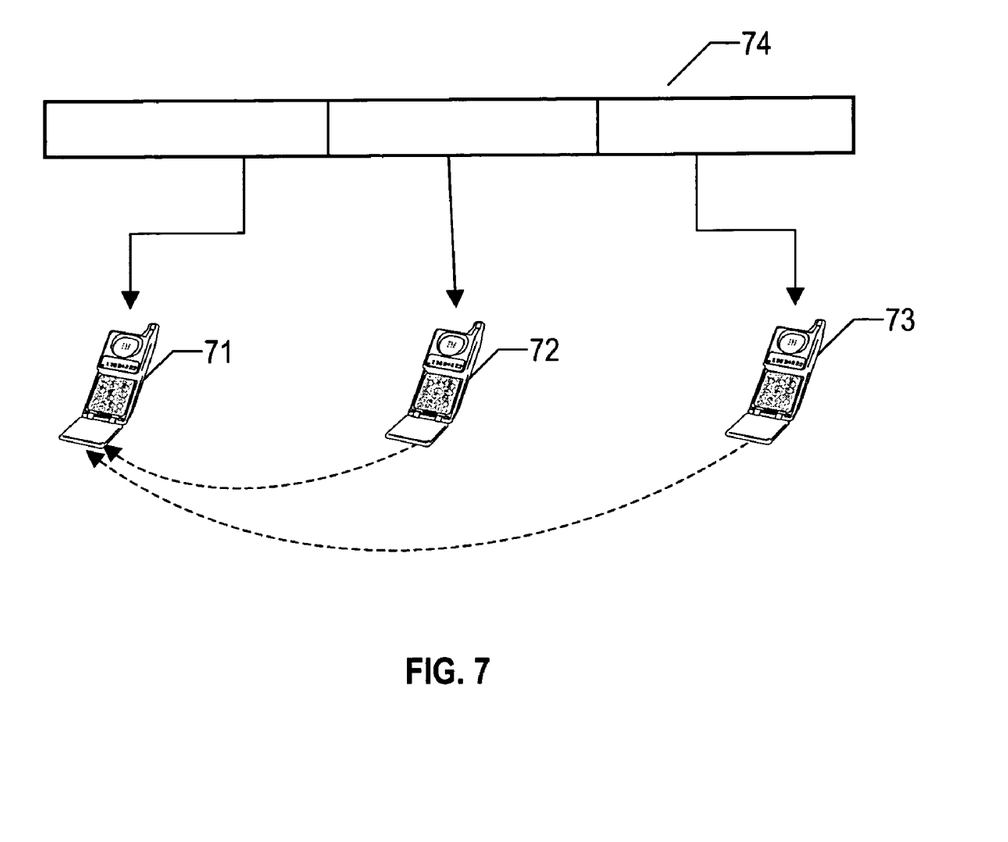
FIG. 7 is configuration of the data transmission scheme of the present invention.

FIG. 7 is configuration of the data transmission system of the present invention. In this scheme, each wireless telephone in the group will receive a portion of the data packet that is desired by the requestor wireless telephone. In this illustration, wireless telephone 71 is the requestor telephone and wireless telephones 72 and 73 are the contributor wireless telephones that will receive the message. A data packet 74 can be downloaded from a specific location that can be accessed from a global communication network such as the Internet. Since wireless telephones have limited bandwidth, if this file is quite large, the wireless telephone may not have sufficient bandwidth to reliably and timely download that file. Therefore, each of the three wireless telephones in the group will be assigned a portion of the packet to download. Using FIG. 6 for purposes of explanation, if the packet required bandwidth from $F_1$ to $F_5$, this packet could be distributed between the three wireless telephones (the requestor and two contributor telephones). As the contributor wireless telephones receive their portions of the packet, these portions are transmitted to the requester using a Bluetooth technology. This technology facilitates the communication of devices that are in reasonably close distance to each other. The transmitted portions of the data packet are seamed back together into the originally transmitted document at the requestor. Because of the ability to divide the information packet into sections, the entire data packet was transmitted at a much narrower bandwidth than had the packet remain unchanged. Although, in the scheme of the present invention, there are two transmissions of the information, these two transmissions are shown to be faster than the one attempt to transmit the entire large packet of information over one wireless telephone device.

Figure 8A:
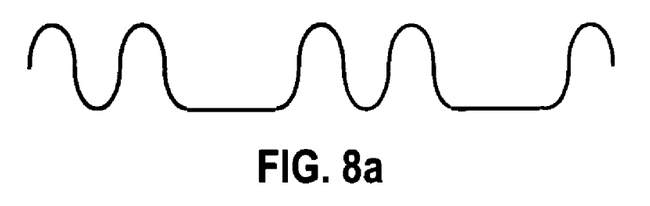
FIG. 8a is an illustration of original data for transmission in accordance with the present invention.
Figure 8B:
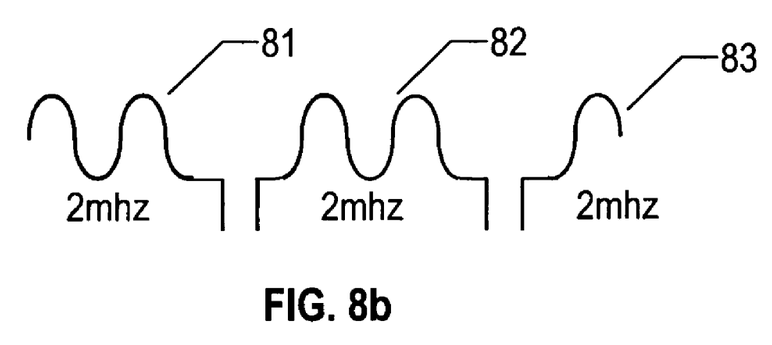
FIG. 8b is an illustration of original data divided for receipt among multiple wireless connections in accordance with the present invention.
Figure 8C:
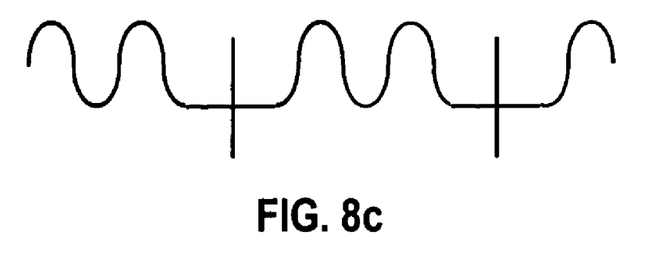
FIG. 8c is an illustration of data received at multiple wireless connections seamed together at the requestor device in order to reproduce the original data transmitted in accordance with the present invention.

FIGS. 8a, 8b and 8c are illustrations of the division, transmission and receipt of information in accordance with the present invention. These figures are intended to illustrate the transmission concept of the present invention. Shown in FIG. 8a is a set of data for transmission. This data set has a bandwidth of 6 MHZ. As previously mentioned, if the receiver wireless device has a maximum bandwidth of 2 MHZ, then this bandwidth would be too large for one wireless device to receive the data packet. Therefore, it will be necessary to divide this information between multiple wireless devices.

FIG. 8b shows a division of the original set of data set of FIG. 8a. This data set division is in three segments. In accordance with the present invention, this division of the data set into three segments, 81, 82 and 83, suggests one requestor device and two contributor devices will receive this data set. Each segment has an approximate bandwidth of 2 MHZ. Segment 81 could have a bandwidth from 0 to 2 MHZ. Segment 82 could have a bandwidth from 2 MHZ to 4 MHZ. Segment 83 could have a bandwidth from 4 MHZ to 6 MHZ. Each receiver device would receive one segment of the data set. FIG. 8c shows the connecting or seaming together of the three data segments received the three receiver devices to get the originally transmitted data set. In accordance with the present invention, the contributor devices would transmit their received information to the requester device.

Figure 9:
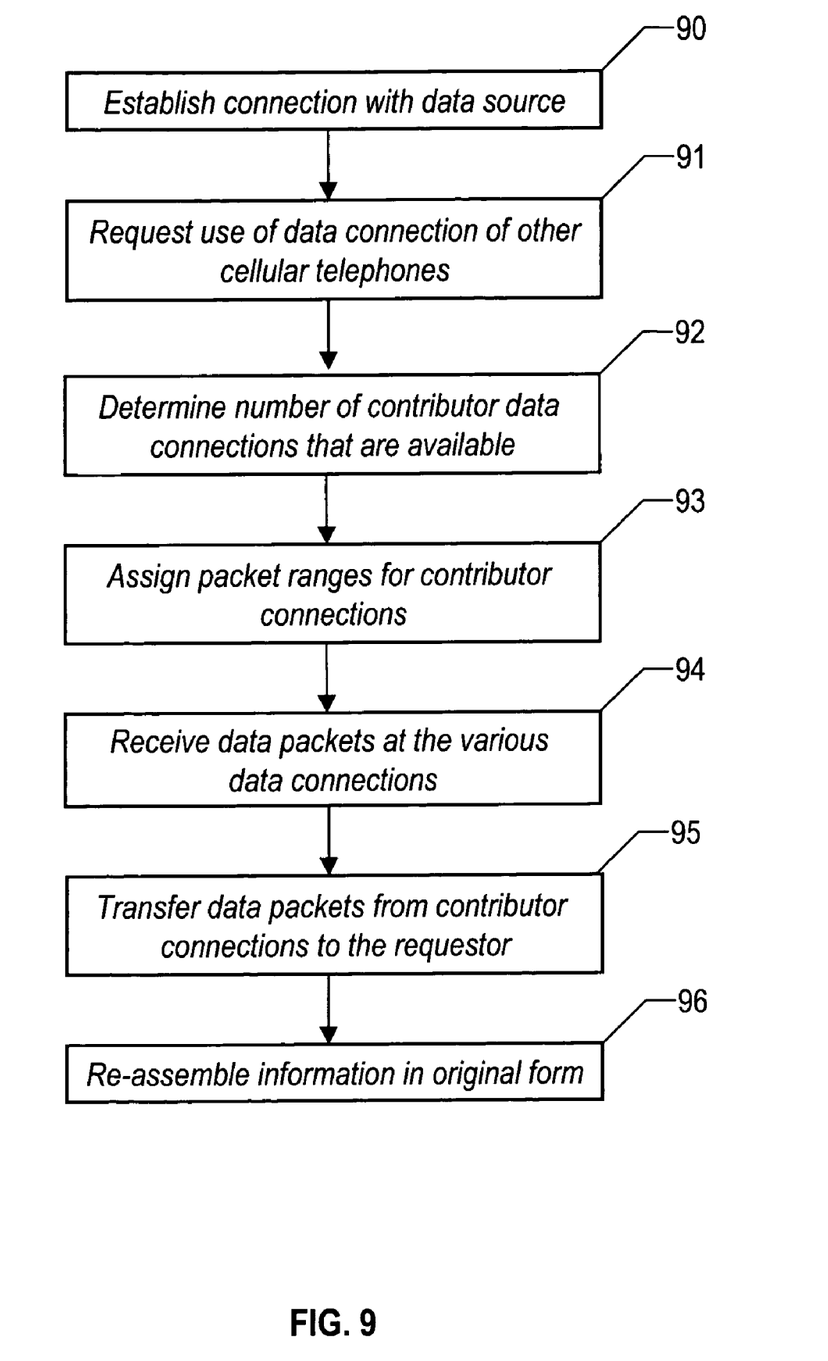
FIG. 9 is a flow diagram of the general steps in the implementation of the present invention.

FIG. 9 is a flow diagram of the general steps in the implementation of the present invention. The process begins with the establishment of a connection with a data source usually accessed via the Internet in step 90. User has already made the determination that the information to be downloaded would take an inordinate amount to download because of the size of the packet and the fact that the download would be to a wireless telephone device. In step 91, the user (wireless telephone requestor) makes requestor of other wireless telephone users to user their wireless telephone devices to assist in downloading the information. At this point, the requestor receives responses from the other wireless telephone users that received the requests to user their devices for the download process. Based on the responses, in step 92, the requestor makes a determination of the number devices available to assist in the download process. After the determination of the number of devices available for the download, step 93 assigns packet ranges for the requestor and contributor devices. These packet ranges can be analogous to frequency ranges in which each device will receive data/information. At this point, step 94 begins the download process of the information. As mentioned, each device receives the portion of the information assigned to that device. As the contributor devices receive information from the source, step 95 transfers this information via a protocol such as Bluetooth to the requestor device. At the requestor device, system software seams back together the data received at the various contributor and requestor devices in step 96.

Figure 10:
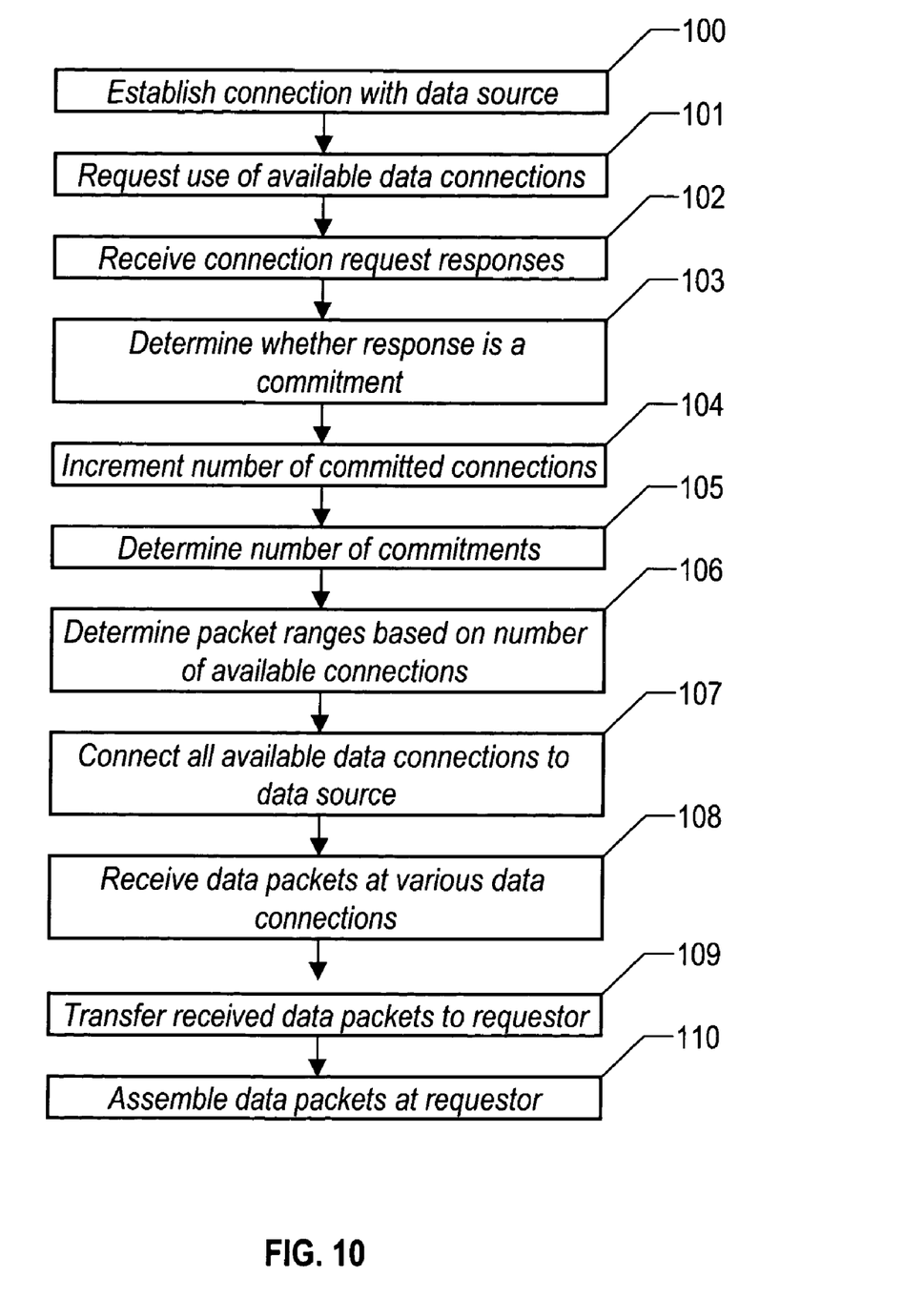
FIG. 10 is a detailed flow diagram of the steps in the implementation of the present invention.

FIG. 10 is a detailed flow diagram of the steps in the implementation of the present invention. Step 100 establishes a connection via a communication network such as the Internet between the user of a wireless device and an information source location. After the user decides to download information from this source, the user concludes that the desired information is at size that is too large to download to the wireless device within a reasonable time period. The estimated download time is based on the size of the information packet and the bandwidth of the wireless device. After concluding that the download of the information from the wireless device will be difficult, the user (the requestor) in step 101 makes a request to other wireless devices (contributors) in the immediate vicinity to assist in the download of the information. This request could include an estimate of the time it may require to download the information. This estimate could help the other wireless users determine whether or not they could assist in the download of this information. As the previously mentioned, the present invention can implement wireless Bluetooth technology to facilitate communication between the requester device and any contributor devices. The Bluetooth technology operates at a range of approximately 30 feet. Therefore, the immediate vicinity for other wireless users for implementation of the present invention should be approximately 30 feet.

In step 102, the requestor device receives responses from the other wireless devices. These responses could be a confirmation to assist in the download or a refusal to assist in the download. Step 103 determines whether a response is commitment. The commitment response could be a touchtone response by the user. For example, after the user receives the request, pressing the "1" key could signal to the requester a commitment to assist in the download. In the alternative, pressing the "2" could signal a refusal to assist. Since the method only counts commitments, no response would also indicate a refusal to assist in the download. When the received response is a commitment, step 104 increments a commitment counter. After a set amount of time, step 105 makes a determination of the number of commitments based on the counter number. In an alternative approach, if the requestor knows the number of other users, there may not be a need to wait a set amount of time. Once the requestor has received responses from all of the users, the requestor can make the determinations of step 105.

At this point, the requester knows the size of the information packet and the number of devices that are available to download this information packet. In step 106, there can be division of the information packet into small packet sizes that are easy to download using the total number of wireless devices. Step 106 would determine the size of each packet. In addition, each wireless device would be assigned a packet range to download. This packet range is similar to assigning each device a bandwidth for which the device would receive information.

In step 107, all of the wireless devices (the requester and contributors) would receive instructions to connect to the location of the information source. The requestor may already have a connection to the location. After the devices connect to the information source location, in step 108 each device would download the assigned packet range as illustrated in FIG. 8b. Step 109 involves sending the data received at the contributor devices to the requester device using Bluetooth technology. In step 110, existing data seaming technologies similar to those for seaming data to conventional computers can accomplish this transfer. At the completion of step 110, the downloaded data appears as shown in FIG. 8c.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for seamless integration of multiple wireless data connections comprising the steps of:

establishing a connection with a data source from a requester device for the purpose of retrieving information from the data source;

determining characteristics of data to be retrieved from the data source including a size of the data and an estimate of time required to retrieve the data at the requester device;

requesting assistance from other wireless devices (contributors) in an immediate vicinity of the requestor device to assist in the retrieval of the information, by sending requests to wireless devices in the immediate vicinity of the requester device requesting assistance in retrieving information packets;

receiving responses from the other wireless devices with regard to availability to retrieve information from the data source for the requestor device, in response to a request for use in the retrieval of information packets;

determining a number of confirmed wireless devices that will assist in the retrieval of data from the data source; the determined wireless devices being contributor devices and the number of confirmed devices and the requestor device being a total number of receiver devices;

determining packet ranges for the data to be retrieved based on the number of available wireless devices that will retrieve data;

assigning packet ranges for the data to be retrieved between the requestor device and the contributor devices;

connecting all contributor devices to the data source by determining the size of an information packet to be downloaded to the requestor device; and dividing the information packet into ranges based on the total number of receiver devices;

receiving information packets at the requestor and contributor devices;

transmitting the received packets from the contributor devices to the requestor device; and assembling the received packets at the requestor device into the original data downloaded from the data source.

* * * * *